US005769372A

United States Patent [19]
Klosterman

[11] Patent Number: 5,769,372
[45] Date of Patent: Jun. 23, 1998

[54] HUNTING WEAPON HOLDER

[75] Inventor: Michael W. Klosterman, Mogadore, Ohio

[73] Assignee: Klawhorn Industries Inc., Bay Village, Ohio

[21] Appl. No.: 641,634

[22] Filed: May 2, 1996

[51] Int. Cl.$^6$ .................................................. A47B 96/06
[52] U.S. Cl. .................................... 248/219.4; 248/282.1; 248/285.1; 248/217.3
[58] Field of Search .............................. 248/217.3, 326, 248/218.4, 231, 274.1, 282.1, 285.1, 219.4, 219.1, 309.1, 299.1, 284.1, 286.1; 182/33, 33.2, 33.3, 33.4, 33.5, 187, 164; 124/23.1, 86

[56] References Cited

U.S. PATENT DOCUMENTS

| | | | |
|---|---|---|---|
| 289,662 | 12/1883 | Lance . | |
| 776,764 | 12/1904 | Squire . | |
| 783,526 | 2/1905 | C. D. Kemmerer | 248/326 |
| 918,070 | 4/1909 | Menge . | |
| 1,206,574 | 11/1916 | Miller . | |
| 1,288,611 | 12/1918 | Jones | 248/285.1 |
| 2,238,134 | 4/1941 | Schoen | 248/42 |
| 2,663,531 | 12/1953 | Rubano | 248/231 |
| 3,022,898 | 2/1962 | Loeb | 211/64 |
| 4,032,775 | 6/1977 | Bobrick et al. | 240/73 R |
| 4,542,873 | 9/1985 | Matherly et al. | 248/218.4 |
| 4,708,221 | 11/1987 | Kubiak | 182/187 |
| 4,722,501 | 2/1988 | Ruhl | 248/218.4 |
| 5,310,151 | 5/1994 | Engel | 248/231 |
| 5,626,322 | 5/1997 | Braun | 248/282.1 |

*Primary Examiner*—Alvin C. Chin-Shue
*Assistant Examiner*—Gwendolyn W. Baxter
*Attorney, Agent, or Firm*—Tarolli, Sundheim, Covell, Tummino & Szabo

[57] ABSTRACT

A hunting weapon holder includes a base which is connectable with a suitable support, such as a trunk of a tree, by a strap. A support assembly has an inner end portion which is pivotally connected with the base and an outer end portion which is spaced from the trunk of the tree. A weapon hanger is connected with the outer end portion of the support assembly. The support assembly includes a plurality of sections which are disposed in a telescopic relationship with each other. An inner one of the sections is pivotally connected with the base for pivotal movement about an axis which extends parallel to the tree trunk. An outer end portion of an outer one of the sections is pivotal about a second axis which extends parallel to the axis about which the inner section is pivotal.

5 Claims, 1 Drawing Sheet

U.S. Patent    Jun. 23, 1998    5,769,372
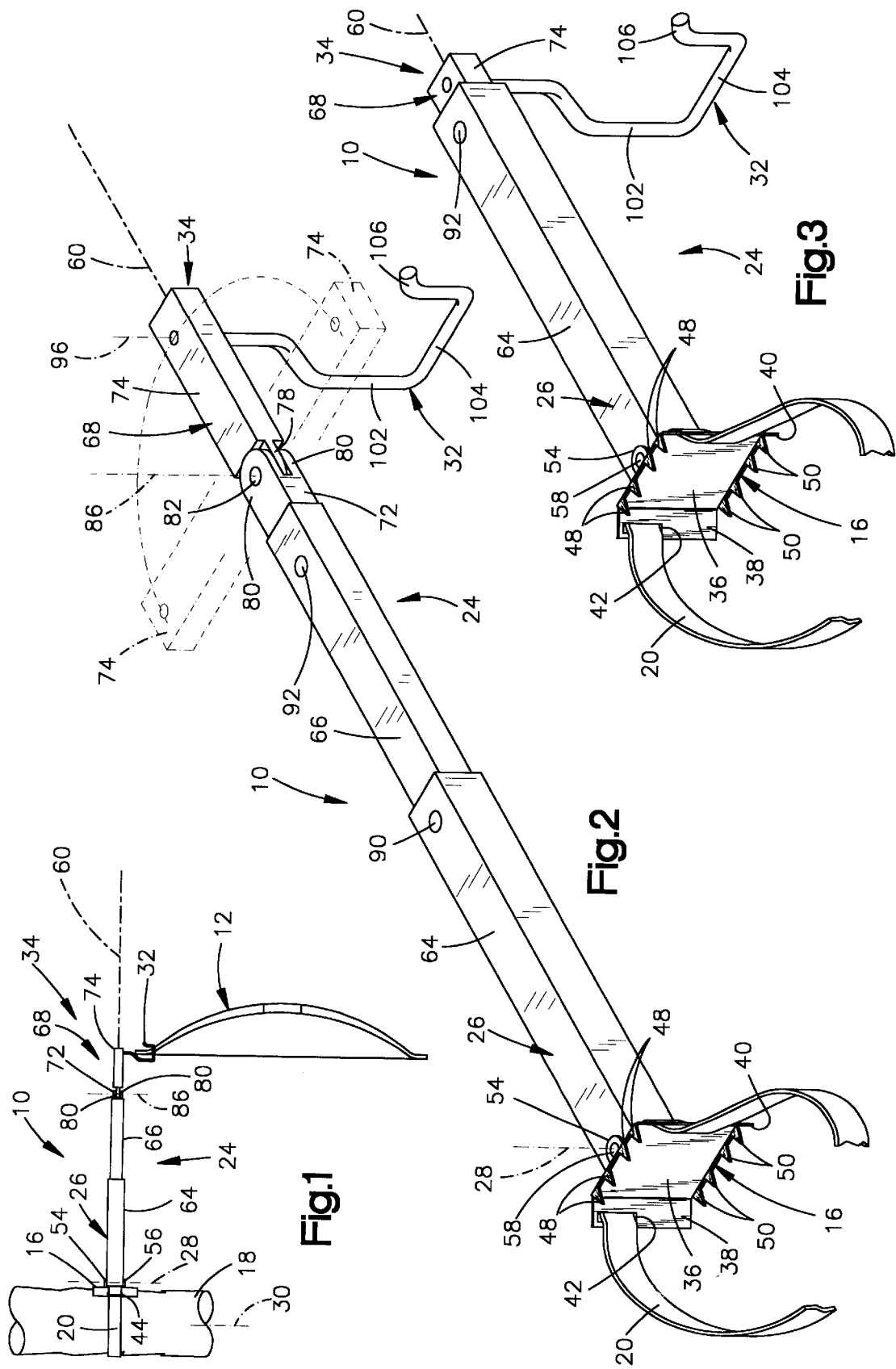

HUNTING WEAPON HOLDER

BACKGROUND OF THE INVENTION

The present invention relates to a new and improved holder for use in supporting a hunting weapon on a trunk of a tree or similar support.

A hunter may wait for the approach of game. During the wait, the hunter may operate various devices to make sounds to attract the game. While the hunter is waiting for the game to approach, it is advantageous to be able to position a weapon, such as a bow or gun, in a location where it is easily reached when the game is sighted.

A known hunting weapon holder is disclosed in U.S. Pat. No. 4,722,501. The hunting weapon holder disclosed in this patent is a bow hanger. The bow hanger includes a rod which is connected with a tree trunk by a strap. The rod has a fixed length and has an end portion which engages the trunk of the tree. This known hunting weapon holder may not be adjustable to an extent necessary to position the hunting weapon in a location desired by a hunter.

SUMMARY OF THE INVENTION

The present invention relates to a new and improved hunting weapon holder for use in supporting a hunting weapon on a trunk of a tree or similar support. The weapon holder includes a base which is connected with the trunk of the tree by a strap. An inner end portion of a support assembly is pivotally connected with the base. A weapon hanger is connected with an outer end portion of the support assembly.

The support assembly is operable between a retracted condition and an extended condition. To enable the support assembly to be extended and retracted, the support assembly includes a plurality of sections which are disposed in a telescopic relationship with each other.

An inner one of the plurality of sections is pivotally connected with the base for pivotal movement about an axis extending along the trunk of the tree. An outer section of the support assembly has an outer portion which is pivotally connected with an inner portion of the outer section. The weapon hanger is mounted on the outer portion of the outer section. The outer portion of the outer section can be pivoted relative to the inner portion of the outer section to further enable the position of the weapon hanger to be adjusted.

BRIEF DESCRIPTION OF THE DRAWINGS

The foregoing and other features of the invention will become more apparent upon a consideration of the following description taken in connection with the accompanying drawings, wherein:

FIG. 1 is a schematic illustration depicting the manner in which a hunting weapon holder constructed in accordance with the present invention is connected with a trunk of a tree or similar support;

FIG. 2 is an enlarged pictorial illustration of the hunting weapon holder of FIG. 1 in an extended condition; and FIG. 3 is a pictorial illustration, generally similar to FIG. 2, of the hunting weapon holder in a retracted condition.

DESCRIPTION OF ONE SPECIFIC PREFERRED EMBODIMENT OF THE INVENTION

A hunting weapon holder 10 constructed in accordance with the present invention is illustrated in FIG. 1. The hunting weapon holder 10 is used to support hunting weapon, such as a bow 12, while a hunter is waiting for an opportunity to use the weapon. The hunting weapon holder 10 is adjustable to position the weapon 12 in a desired location where the weapon can be easily grasped by the hunter and moved into position for use.

The hunting weapon holder 10 includes a metal base 16 which is connected with a trunk 18 of a tree by a flexible strap 20. The length of the flexible strap 20 is adjustable to enable the hunting weapon holder to be moved along the trunk 18 of the tree to any desired level above the ground. The length of the strap 20 is also adjustable to accommodate tree trunks of different diameters. Of course, the strap 20 may be used to connect the base 16 with any desired support, such as a pole or post.

A support assembly 24 extends outward from the base 16. The overall length of the support assembly 24 can be varied. An inner end portion 26 of the support assembly 24 is pivotally connected with the base 16. Thus, the inner end portion 26 of the support assembly 24 is pivotal about a vertical axis 28 which extends parallel to a longitudinal central axis 30 of the trunk 18 of the tree. A weapon hanger 32 is connected with an outer end portion 34 of the support assembly 24 and supports a weapon, that is, the bow 12.

The base 16 has a flat rectangular main panel 36 (FIG. 2) and a pair of rectangular side panels 38 and 40 which are integrally formed as one piece with the main panel 36. The side panels 38 and 40 are skewed at acute angles to the main panel 36. The side panels 38 and 40 have slots 42 and 44 (FIGS. 1 and 2) through which the strap 20 extends. When the strap 20 is wrapped around the trunk 18 of a tree, as shown in FIG. 1, and tightened, the main panel 36 and side panels 38 and 40 are pressed against the trunk of the tree.

Upper teeth 48 (FIG. 2) are provided along an upper edge portion of the main panel 36 and lower teeth 50 are provided along a lower edge portion of the main panel 36. The upper and lower teeth 48 and 50 extend perpendicular to the main panel 36. The upper and lower teeth 48 and 50 are pressed into the trunk of the tree by force applied against the base 16 by the strap 20. The side panels 38 and 40 cooperate with the main panel 36 to engage the trunk 18 of the tree and stabilize the base 16 against movement relative to the trunk of the tree. The base 16 may be formed of steel.

The support assembly 24 is connected with parallel upper and lower bracket arms 54 and 56 (FIGS. 1 and 2) which extend from the main panel 36 in a direction opposite to the teeth 48 and 50. A suitable pivot pin 58 (FIG. 2) extends between the upper and lower bracket arms 54 and 56 and extends through the inner end portion 26 of the support assembly 24. This results in the support assembly 24 being supported for pivotal movement relative to the base 16 about the axis 28. The axis 28 extends parallel to major side surfaces of the main panel 36 and perpendicular to a longitudinal central axis 60 of the support assembly 24.

The support assembly 24 can be operated between the extended condition of FIG. 2 and the retracted condition of FIG. 3. When the support assembly 24 is in the retracted condition of FIG. 3, the hunting weapon holder 10 can be readily transported to and from a location where it is to be used to support a weapon, such as the bow 12 (FIG. 1). When the support assembly 24 is in the extended condition of FIG. 2, the weapon hanger 32 is positioned a maximum distance from the base 16 and the trunk 18 of a tree to which the base is connected by the strap 20 (FIG. 1). The extent to which the support assembly 24 is extended can be varied to vary the distance which the weapon hanger 32 is disposed from the base 16 and the trunk 18 of the tree to accommodate different positions of a hunter relative to the trunk of the tree.

The support assembly 24 (FIG. 2) includes a plurality of metal sections which are disposed in a telescopic relationship with each other. Thus, the support assembly 24 includes a tubular inner or base section 64. The inner section 64 is pivotally connected to the base 16 by the pin 58. The inner section 64 is pivotal relative to the base 16 about the axis 28.

A tubular intermediate section 66 is disposed in a telescopic relationship with the inner section 64. The intermediate section 66 can be telescoped into the hollow inner section 64 to reduce the overall length of the support assembly 24 (see FIG. 3). A solid outer section 68 (FIG. 2) is disposed in a telescopic relationship with the hollow intermediate section 66 and can be telescoped into the intermediate section to further vary the overall length of the support assembly 24. If desired, the sections 64, 66 and 68 may be formed of aluminum.

In accordance with one of the features of the present invention, the outer section 68 includes a solid metal inner portion 72 which is shown in FIG. 2 telescoped into the hollow intermediate section 66. In addition, the outer section 68 includes a solid metal outer portion 74 which is pivotally connected with the inner portion 72. Thus, the outer portion 74 has a tongue 78 which extends between a pair of arms 80 on an outer end of the inner portion 72 of the outer section 68. The tongue 78 is pivotally connected with the arms 80 by a pin 82 to enable the outer portion 74 of the outer section 68 to pivot about an axis 86 which extends parallel to the axis 28 and perpendicular to the longitudinal central axis 60 of the support assembly 24.

The outer portion 74 of the outer section 68 can be pivoted from the central position shown in solid lines in FIG. 2 to any position between the two limit positions indicated in dashed lines in FIG. 2. When the outer portion 74 is in either one of the two limit positions shown in dashed lines in FIG. 2, a central axis of the outer portion 74 extends perpendicular to the central axis 60 of the support assembly 24. This allows the weapon hanger 32 to be offset to either side of the central axis 60 of the support assembly 24 when the support assembly is in the extended condition of FIG. 2. Of course, the ability to pivot the outer portion 74 of the outer section 68 relative to the intermediate section 66 and inner section 64 of the support assembly 24 facilitates positioning the weapon hanger 32 in a desired location relative to a hunter.

When the support assembly 24 is in the extended condition shown in FIGS. 1 and 2, a weapon, such as the bow 12, may apply a force to the weapon hanger 32 which tends to rotate the support assembly 24 about its longitudinal central axis 60. Thus, a torque may be transmitted from the weapon hanger 32 to the outer section 68 of the support assembly 24. This torque is transmitted through the intermediate section 66 and inner section 64 of the support assembly 24 to the base 16.

To provide for the transmission of torsional forces from the weapon hanger 32 to the base 16, the inner section 64, intermediate section 66 and outer section 68 have rectangular cross sectional configurations. The rectangular cross sectional configurations of the inner, intermediate and outer sections 64, 66 and 68 of the support assembly 24 enables torsional forces to be transmitted between the sections of the support assembly 24. These torsional forces are transmitted to the upper and lower bracket arms 54 and 56 (FIG. 1) through the pivot pin 58 which interconnects the support assembly 24 and base 16.

The extent of the telescopic relationship between the sections 54, 56 and 58 of the support assembly 24 can be varied by moving the intermediate and outer sections 66 and 68 axially relative to each other and to the inner section 64. For example, the intermediate section 66 may be fully telescoped into the hollow inner section 64. However, the outer portion 74 of the outer section 68 may extend outward from the hollow intermediate section 66. This would shorten the support assembly 24 while still enabling the outer portion 74 of the outer section 68 to be pivoted from the position shown in solid lines in FIG. 2 to any position between the two limit positions shown in dashed lines in FIG. 2.

Although the length of the support assembly 24 can be varied by varying the extent of the telescopic relationship between the various sections 64, 66 and 68 of the support assembly, it is believed that it may frequently be desired to have the support assembly 24 in the fully extended position of FIG. 2. To retain the inner section 64 and intermediate section 66 in the fully extended position shown in FIG. 2, a spring loaded plunger assembly 90 is mounted on the inner section 64. The spring loaded plunger assembly 90 is engageable with a suitable opening (not shown) provided in the intermediate section 66 to retain the intermediate section 66 against axial movement relative to the inner section 64.

Similarly, a spring loaded plunger assembly 92 is provided on the outer end portion of the intermediate section 66. The spring loaded plunger assembly 92 engages a suitable opening (not shown) in the inner portion 72 of the outer section 68 to retain the outer section against axial movement relative to the intermediate section. If desired, the plunger assemblies 90 and 92 could be replaced by suitable set screws or other devices to lock the inner, intermediate and outer sections 64, 66 and 68 of the support assembly 24 against axial movement.

In the illustrated embodiment of the support assembly 24, there are three sections 64, 66 and 68 which are disposed in a telescopic relationship with each other. It is contemplated that the support assembly 24 could be constructed with either a greater or lesser number of sections if desired. For example, the inner section 64 could be eliminated and the intermediate section 66 pivotally connected directly with the base 16 rather than being connected with the base through the inner section 64.

The weapon hanger 32 (FIG. 2) is pivotally connected with the outer portion 74 of the outer section 68. The weapon hanger 32 is pivotal about a vertical axis 96 which extends perpendicular to the center line 60 of the support assembly 24 and parallel to the axes 28 and 86. If desired, a lock nut could be provided in association with the hanger 32 to fix the hanger in the desired angular orientation relative to the outer section 68 of the support assembly 24.

The weapon hanger 32 includes a main section 102 which extends downward from the outer section 68 of the support assembly 24. A support section 104 extends transverse to the main section 102 of the weapon hanger 32. Finally, a retainer section 106 extends upward from the support section 104.

Although it is believed that a weapon hanger 32 having the illustrated configuration may be preferred, the weapon hanger could have a different configuration. For example, when the hunting weapon is to be a gun, the weapon hanger 32 may be a pair of flexible members or straps which extend downwardly from the outer section 68 of the support assembly 24. The lower ends of the straps may be provided with suitable loops or hooks to engage the butt and hand guard portions of the stock of the gun.

In view of the foregoing description, it is apparent that the present invention relates to a new and improved hunting weapon holder 10 for use in supporting a hunting weapon 12 on a trunk 18 of a tree or similar support. The weapon holder 10 includes a base 16 which is connected with the trunk 18 of the tree by a strap 20. An inner end portion 26 of a support assembly 24 is pivotally connected with the base 16. A weapon hanger 32 is connected with an outer end portion 34 of the support assembly 24.

The support assembly 24 is operable between a retracted condition (FIG. 3) and an extended condition (FIG. 2). To enable the support assembly 24 to be extended and retracted, the support assembly includes a plurality of sections 64, 66 and 68 which are disposed in a telescopic relationship with each other.

An inner one 64 of the plurality of sections is pivotally connected with the base 16 for pivotal movement about an axis 28 extending along the trunk of the tree. An outer section 68 of the support assembly 24 has an outer portion 74 which is pivotally connected with an inner portion 72 of the outer section 68. The weapon hanger 32 is mounted on the outer portion 74 of the outer section 68. The outer portion 74 of the outer section 68 can be pivoted relative to the inner portion 72 of the outer section 68 to further enable the position of the weapon hanger 32 to be adjusted.

Having described the invention, the following is claimed:

1. A hunting weapon holder for use in supporting a hunting weapon on a trunk of a tree or similar support, said hunting weapon holder comprising a base which is engageable with a trunk of a tree, a strap which is connected with said base and is positionable around the trunk of the tree to retain said base against movement relative to the trunk of the tree, a support assembly having a first end portion pivotally connected with said base and pivotal relative to said base and the trunk of the tree about a first axis which extends along the trunk of the tree when said base is connected with the trunk of the tree by said strap, and a weapon hanger means connected with a second end portion of said support assembly for engaging the hunting weapon and for supporting the hunting weapon on said second end portion of said support assembly, said support assembly including an intermediate section which is pivotally connected with said base and is pivotal relative to said base about the first axis which extends along the trunk of the tree and an outer section which is disposed in a telescopic relationship with said intermediate section, said outer section being axially movable relative to said intermediate section to vary the extent of the telescopic relationship between said outer and intermediate sections to thereby vary the distance between said weapon hanger means and the trunk of the tree, said outer section of said support assembly includes an inner portion which is disposed in a telescopic relationship with said intermediate section of said support assembly, an outer portion which is connected with said weapon hanger means, and a pivot connection which interconnects said inner and outer portions of said outer section, said pivot connection including means for enabling said outer portion of said outer section to pivot about a second axis which extends parallel to said first axis.

2. A hunting weapon holder as set forth in claim 1 wherein said outer section is telescopically movable relative to said intermediate section between a retracted condition and an extended condition, said inner portion and said pivot connection being disposed within said intermediate section and said outer portion being at least partially disposed within said intermediate section when said outer section is in the retracted condition, said outer portion and said pivot connection being spaced from said intermediate section when said outer section is in the extended condition.

3. A hunting weapon holder as set forth in claim 1 wherein said weapon hanger means is pivotally connected with said outer portion of said outer section and is pivotal about a third axis which extends parallel to said first and second axes.

4. A hunting weapon holder as set forth in claim 1 wherein said support assembly includes a base section, said intermediate section being disposed in a telescopic relationship with said base section.

5. A hunting weapon holder for use in supporting a hunting weapon on a trunk of a tree or similar support, said hunting weapon holder comprising a base which is engageable with a trunk of a tree, a strap which is connected with said base and is positionable around the trunk of the tree to retain said base against movement relative to the trunk of the tree, a support assembly having a first end portion pivotally connected with said base and pivotal relative to said base and the trunk of the tree about a first axis which extends along the trunk of the tree when said base is connected with the trunk of the tree by said strap, and a weapon hanger means connected with a second end portion of said support assembly for engaging the hunting weapon and for supporting the hunting weapon on said second end portion of said support assembly, said support assembly including a base section which is pivotally connected to said base and is pivotal relative to said base about the first axis which extends along the trunk of the tree, an intermediate section which is disposed in a telescopic relationship with said base section, said intermediate section being axially movable relative to said base section to vary the extent of the telescopic relationship between said intermediate and base sections to thereby vary the distance between said weapon hanger means and the trunk of the tree, and an outer section which is disposed in a telescopic relationship with said intermediate section, said outer section being axially movable relative to said intermediate section to vary the extent of the telescopic relationship between said outer and intermediate sections to thereby vary the distance between said weapon hanger means and the trunk of the tree, said weapon hanger means being pivotally connected with said outer section and being pivotal about a second axis which extends parallel to said first axis, wherein said outer section of said support assembly includes an inner portion which is disposed in a telescopic relationship with said intermediate section of said support assembly, an outer portion which is connected with said weapon hanger means, and a pivot connection which interconnects said inner and outer portions of said outer section, said pivot connection including means for enabling said outer portion of said outer section to pivot about a second axis which extends parallel to said first axis, said outer section being telescopically movable relative to said intermediate section between a retracted condition and an extended condition, said inner portion and said pivot connection being disposed within said intermediate section and said outer portion being at least partially disposed within said intermediate section when said outer section is in the retracted condition, said outer portion and said pivot connection being spaced from said intermediate section when said outer section is in the extended condition—has been inserted.

* * * * *